United States Patent [19]

Fotland

[11] 4,409,604

[45] Oct. 11, 1983

[54] ELECTROSTATIC IMAGING DEVICE

[75] Inventor: Richard A. Fotland, Holliston, Mass.

[73] Assignee: Dennison Manufacturing Company, Framingham, Mass.

[21] Appl. No.: 222,830

[22] Filed: Jan. 5, 1981

[51] Int. Cl.[3] .......................... G01D 15/06; H01J 7/24; H05B 31/26

[52] U.S. Cl. .................................... 346/159; 250/426; 315/111.81

[58] Field of Search ..................... 346/75, 139 C, 155, 346/159, 162–165; 250/426, 326; 313/217; 315/111.8, 111.9; 358/300; 361/229–230

[56] References Cited

U.S. PATENT DOCUMENTS

| | | | |
|---|---|---|---|
| 4,057,723 | 11/1977 | Sarid et al. | 250/326 |
| 4,068,284 | 1/1978 | Wheeler et al. | 361/230 |
| 4,110,614 | 8/1978 | Sarid et al. | 250/324 |
| 4,155,093 | 5/1979 | Fotland | 346/159 |
| 4,160,257 | 7/1979 | Carrish | 346/159 |
| 4,353,970 | 11/1982 | Dryczynski et al. | 346/159 |

*Primary Examiner*—Thomas H. Tarcza
*Attorney, Agent, or Firm*—Arthur B. Moore

[57] ABSTRACT

An electrostatic imaging device including an elongate conductor coated with a dielectric, and a transversely oriented conductor contacting or closely spaced from the dielectric-coated conductor. A varying potential between the two conductors results in the formation of a pool of ions of both polarities near the crossover area. Ions are selectively extracted by means of an extraction potential to form a discrete, well-defined charge image on a receptor surface.

35 Claims, 8 Drawing Figures

ELECTROSTATIC IMAGING DEVICE

BACKGROUND OF THE INVENTION

This invention relates to the generation of charged particles and more particularly to the use of the charged particles in electrostatic imaging.

Ions can be generated to form electrostatic images in a wide variety of ways. Common techniques include the use of air gap breakdown, corona discharges and spark discharges.

Air gap breakdown, i.e. discharges occuring in small gaps between a conductive surface and the surface of a dielectric material, are widely employed in the formulation of electrostatic images. Representative U.S. Pat. Nos. are G. R. Mott 3,208,076; R. F. Howell 3,438,053; E. W. Marshall 3,631,509; A. D. Brown, Jr. 3,662,396; R. T. Lamb 3,725,950; A. E. Bliss et al. 3,792,495; G. Krekow et al. 3,877,038; and R. F. Borelli 3,958,251.

In the case of air gap breakdown it is necessary that the gap spacing be maintained between about 0.2 and 0.8 mils in order to be able to operate with applied potentials at reasonable levels and maintain charge image integrity. Even then the latent charged image is not uniform, so the resultant electrostatically toned image lacks good definition and dot fill. The discharge in such devices depends on external circuit elements rather than inherent characteristics of the device. The disruptive nature of the air gap breakdown leads to a limited surface life in such a device.

An alternative to air gap breakdown is the corona discharge from a small diameter wire or a point source. Illustrative U.S. Pat. Nos. are P. Lee 3,358,289; Lee F. Frank 3,611,414; A. E. Jvirblis 3,623,123; P. J. McGill 3,715,762; H. Bresnik 3,765,027; and R. A. Fotland 3,961,564. Corona discharges are used almost exclusively in electrostatic copiers to charge photoconductors prior to exposure, as well as for discharging. These applications require large area blanket charging/discharging, as opposed to formation of discrete electrostatic images. Unfortunately, standard corona discharges provide limited currents. The maximum discharge current density heretofore obtained has been on the order of 10 microamperes per square centimeter. This can impose a severe printing speed limitation. In addition, coronas can create significant maintenance problems. Corona wires are small and fragile and easily broken. Because of their high operating potentials they collect dirt and dust and must be frequently cleaned or replaced.

Corona discharge devices which enjoy certain advantages over standard corona apparatus are disclosed in Sarid et al., U.S. Pat. Nos. 4,057,723; Wheeler et al. 4,068,284; and Sarid 4,110,614. These patents disclose various corona charging devices characterized by a conductive wire coated with a relatively thick dielectric material, in contact with or closely spaced from a further conductive member. A supply of positive and negative ions is generated in the air space surrounding the coated wire, and ions of a particular polarity are extracted by a direct current potential applied between the further conductive member and a counterelectrode. Such apparatus ovecomes many of the above-mentioned disadvantages of prior art corona charge and discharging devices but is unsuitable for electrostatic imaging. This limitation is inherent in the feature of large area charging, which does not permit formation of discrete, well-defined electrostatic images. This prior art corona device requires relatively high extraction potentials due to greater separation from the dielectric receptor, and provides exponential ion current outputs in contrast to the linear outputs of the present invention.

Another device particularly suitable for electrostatic imaging is disclosed in R. A. Fotland et al. U.S. Pat. No. 4,155,093. This patent discloses an ion generating device including a solid dielectric member, contacted on opposite sides by two planar electrodes. One of the electrodes contains one or more apertures or similar edge surfaces, located opposite the other electrode. A high voltage varying potential between the two electrodes generates a pool of positive and negative ions in the apertures, which ions may be extracted by means of a direct current potential between the apertured electrode and a counterelectrode. This apparatus is suitable for electrostatic imaging in that the apertures may be configured in a desired shape in order to create an electrostatic image of corresponding shape. A multiplexible imaging device may be created by patterning an array of opposing electrodes in a matrix crossover arrangement. This apparatus provides high quality, high speed electrostatic imaging, but achieves limited ion current outputs and is difficult to manufacture.

Accordingly, it is an object of the invention to facilitate the generation of ions, particularly at high current densities. A paramount object is to provide ion generation apparatus for use in electrostatic imaging.

Another object is to provide a reliable and stable source of ions. A related object is to provide an ion generating system which does not require critical periodic maintenance. Another related object is to simplify maintenance and eliminate the objectional characteristics of corona wires, including the fragility and tendency to collect dirt and dust.

A further object of the invention is to provide an easily controllable source of ions. A related object is to achieve a multiplexible source of ions using different sources to supply an alternating breakdown field and an ion extraction field.

Yet another object of the invention is to generate ion currents for use in producing electrostatic images in which charge image integrity is maintained. A related object is to achieve comparatively uniform charge images which can be toned with good definition. Further objects are increased electrostatic printing speed and suitable charge densities.

Still another object of the invention is to provide imaging apparatus with a desirably long service life. A related object is to avoid degradation of the imaging apparatus due to high voltage ion generation.

SUMMARY OF THE INVENTION

The above and related objects are achieved in the electrostatic imaging apparatus of the invention, which is characterized by an elongate first conductor having a dielectric sheath, and a second conductor contacting or minutely spaced from the dielectric sheath and transversely oriented thereto. This apparatus may be used to create an electrostatic image corresponding to a crossover region of the two conductors by means of a varying potential between them, and an extraction potential between the second conductor and a further electrode.

In accordance with one aspect of the invention, the elongate conductor may have a variety of cross sections. In the preferred embodiment, the elongate conductor comprises a cylindrical wire.

In accordance with another aspect of the invention, a variety of insulating materials may be utilized in the dielectric sheath for the elongate conductor. It is generally desirable that this dielectric be of a material which can withstand the high voltages and chemical by-products of the ion generation process. As such, inorganic dielectric substances such as glass and ceramics are especially suitable.

In accordance with a further aspect of the invention, the second conductor may take the form of a planar or strip electrode, a cylindrical wire, or any other generally linear form. Advantageously, the dielectric-coated elongate conductor and the second conductor intersect in a small, well-defined region whereby the imaging apparatus will produce discrete image elements in the form of dots of a similar size. The second conductor contacts the dielectric sheath or is located within 1-2 mils; in the preferred embodiment these two members are in contact.

In accordance with yet another aspect of the invention, the first and second conductors and dielectric sheath are all mounted on an insulating substrate. A variety of geometries may be employed in mounting the two conductors; all of these geometries share the characteristic of transverse orientation between the first and second conductors. In the preferred embodiment, one or more strip electrodes are mounted against an insulating plane, and one or more dielectric-coated wires are disposed over the strip electrodes in a transverse direction. In an alternative embodiment, the insulating substrate is provided with a channel having a cross-section comparable to that of the dielectric-coated elongate conductor, which is embedded in the channel. In this embodiment, the second conductor is transversely mounted over the embedded dielectric-coated conductor, permitting a broader range of cross-sections for the second conductor.

In accordance with a preferred embodiment of the invention, the image forming ion generator may take the form of a multiplexed matrix of dielectric-coated conductors and transverse conductors. Ions are generated in the air space surrounding the dielectric-coated elongate conductors at matrix crossover points with transverse conductor members. Ions may be extracted to form a latent electrostatic image consisting of discrete dots.

In accordance with a further embodiment of the invention, any of the above imaging devices may be combined with an apertured "screen" electrode, which is located between the remaining structure and the image receptor. In the case of a multiplexable matrix print head, the screen electrode electrically isolates the print head from potentials appearing on the image receptor, thereby preventing accidental image erasure. The screen may also be used to provide an electrostatic lensing action. In a specific version of this embodiment, the screen electrode aperture is configured in the shape of a character, symbol or the like, and acts as a mask electrode to provide an electrostatic image of similar shape.

In a preferred implementation of the invention, a multiplexed matrix print head in accordance with the invention is disposed at a distance greater than 1 mil from the surface of a rotatable dielectric cylinder. The print head is selectively actuated to form latent electrostatic images on the cylinder's surface during rotation.

In a further implementation of the invention, a print head configured in a two-dimensional matrix is employed for serial printing of dot matrix characters. The print head is mounted on a reciprocating housing, and may be translated using electronic controlling apparatus. In a related aspect, the transverse conductors are angled to provide interleaved columns of dots. A print device of this nature may be employed to form an electrostatic image on dielectric paper, a dielectric coated transfer member, and the like.

In accordance with yet another embodiment of the invention for high speed serial printing, a dielectric-coated elongate conductor is bonded to an insulating drum in a helical pattern. By rotating the drum, the coated conductor electrode is caused to scan along a given edge line of the drum. The drum is disposed over a parallel array of tangentially oriented wires along the edge line of the drum.

BRIEF DESCRIPTION OF THE DRAWINGS

The above and additional aspects of the invention are further illustrated with reference to the detailed description which follows, taken in conjunction with the drawings in which.

DETAILED DESCRIPTION

Figure 1:
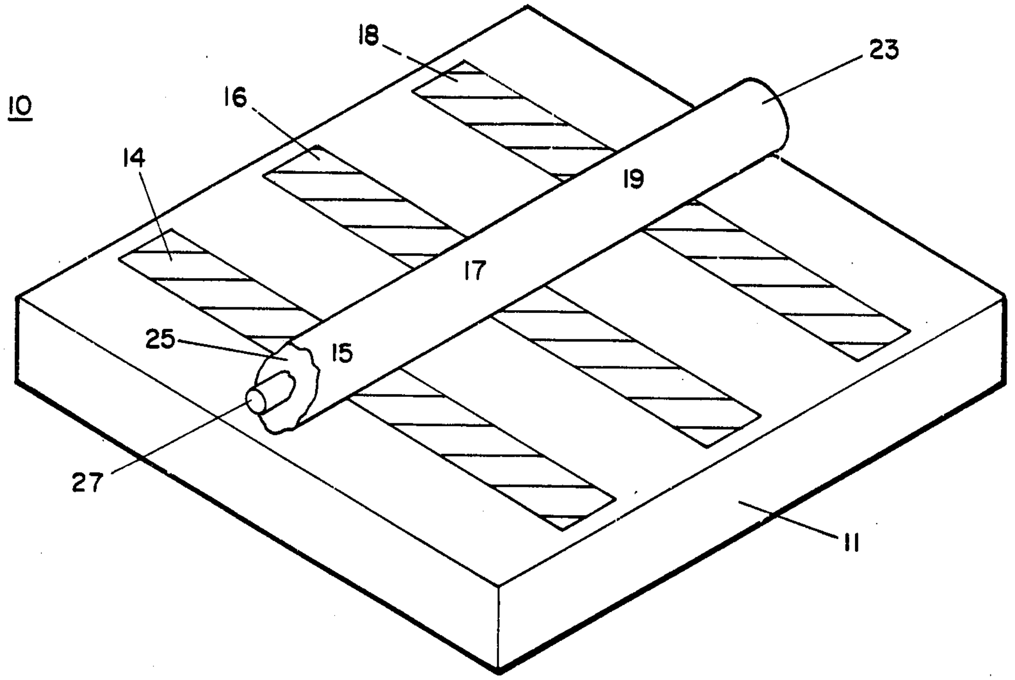
FIG. 1 is a perspective view of an imaging device in accordance with a basic embodiment of the invention.

Reference should now be had to FIGS. 1-8 for a detailed description of the electrostatic imaging device of the invention. This device is shown in its basic embodiment at 10 in FIG. 1.

Print head 10 includes a series of parallel conductive strips 14, 16, 18, etc. laminated to an insulating support 11. One or more dielectric coated wires 23 are transversely oriented to the conductive strip electrodes. The wire electrodes are mounted in contact with or at a minute distance above (i.e. less than 2 mils) the strip electrodes. Wire electrodes 23 consist of a conductive wire 27 (which may consist of any suitable metal) encased in a thick dielectric material 25. In the preferred embodiment, the dielectric 25 comprises a fused glass layer, which is fabricated in order to minimize voids. Other dielectric materials may be used in the place of glass, such as sintered ceramic coatings. Organic insulating materials are generally unsuitable for this application, as most such materials tend to degrade with time due to oxidizing products formed in atmospheric electrical discharges. Although a dielectric-coated cylindrical wire is illustrated in the preferred embodiment, the electrode 23 is more generally defined as an elongate conductor of indeterminate cross-section, with a dielectric sheath.

Crossover points 15, 17, 19, etc. are found at the intersection of coated wire electrodes 23 and the respective strip electrodes 14, 16, 18, etc. An electrical discharge is formed at a given crossover point as a result of a high voltage varying potential supplied by a generator 22 between wire 27 and the corresponding strip electrode. Crossover regions 15, 17, 19, etc. are preferably positioned between 5 and 20 mils. from dielectric receptor 100 (see FIG. 2).

The currents obtainable from an ion generator of the type illustrated in FIG. 1 may be readily determined by mounting a current sensing probe at a small distance above one of the crossover locations 15, 17, 19, etc. Current measurements were taken using an illustrative AC excitation potential of 2000 volts peak to peak at a frequency of 1 MHz, pulse width of 25 microseconds, and repetition period of 500 microseconds. A DC extraction potential of 200 volts was applied between the strip electrode and a current sensing probe spaced 8 mils above the dielectric coated wire 23. Currents in the range from about 0.03 to 0.08 microamperes were measured at AC excitation potentials above the air gap breakdown value, which for this geometry was approximately 1400 volts peak to peak. At excitation voltages above the breakdown value, the extraction current varied linearly with excitation voltage. The extraction current varied linearly with extraction voltage, as well. For probe-wire spacings in the range 4–20 mils, the extraction current was inversely proportional to the gap width. Under 4 mils, the current rose more rapidly. With the above excitation parameters, the imaging device was found to produce latent electrostatic dot images in periods as short as 10 microseconds.

Figure 2:
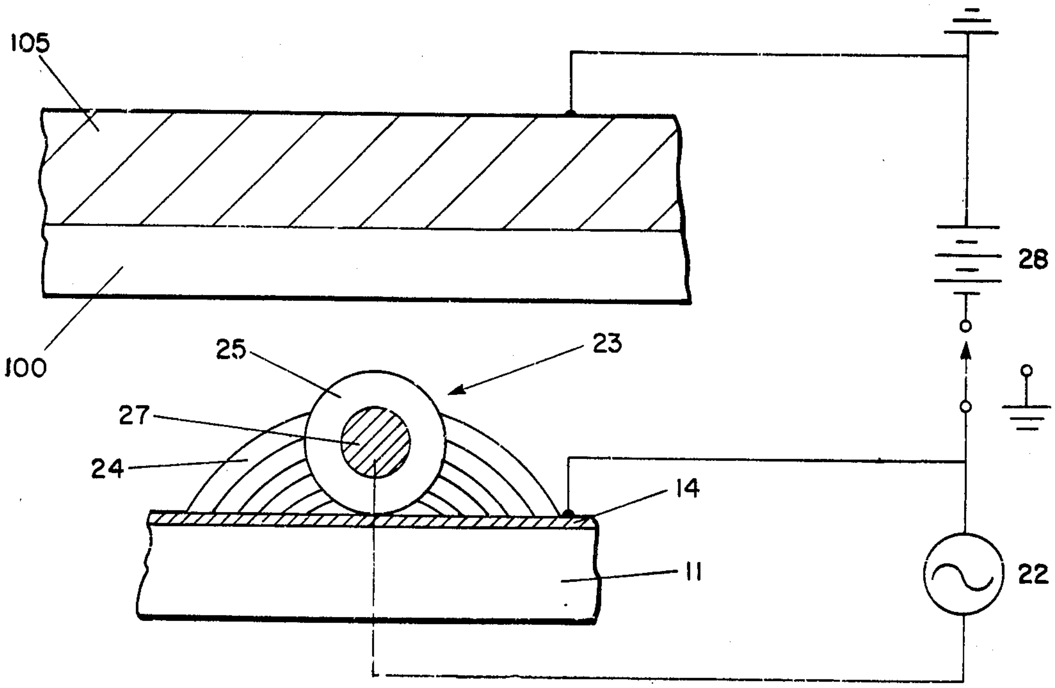
FIG. 2 is a partial sectional view of the device of FIG. 1 in proximity to an image receptor.

In the sectional view of FIG. 2, ions are extracted from an ion generator of the type shown in FIG. 1 to form an electrostatic latent image on dielectric receptor 100. A high voltage alternating potential 22 between elongate conductor 27 and transverse electrode 14 results in the generation of a pool of positive and negative ions as shown at 24. These ions are extracted to form an electrostatic image on dielectric surface 3 by means of a DC extraction voltage 28 between transverse electrode 14 and the backing electrode 105 of dielectric receptor 100. Because of the geometry of the ion pool 24, the extracted ions tend to form an electrostatic image on surface 100 in the shape of a dot.

Figure 3:
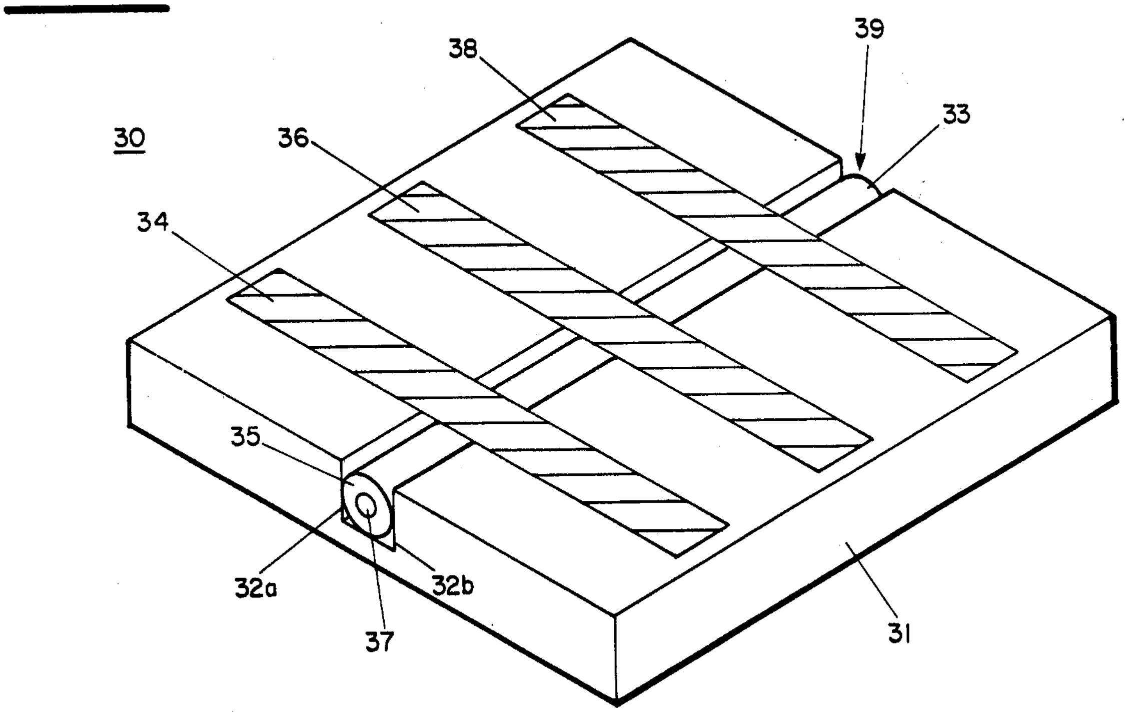
FIG. 3 is a perspective view of an alternative imaging device.

A further imaging device embodiment is illustrated in FIG. 3, showing a print head 30 similar to that illustrated in FIG. 1, but modified as follows. The dielectric coated wire 33 is not located above the strip electrodes, but instead is embedded in a channel 39 in insulating support 31. The geometry of this arrangement may be varied in the separation (if any) of dielectric coated wire 35 from the side walls 32*a* and 32*b* of channel 39; and in the protrusion (if any) of wire electrode 33 from channel 39.

Figure 4:
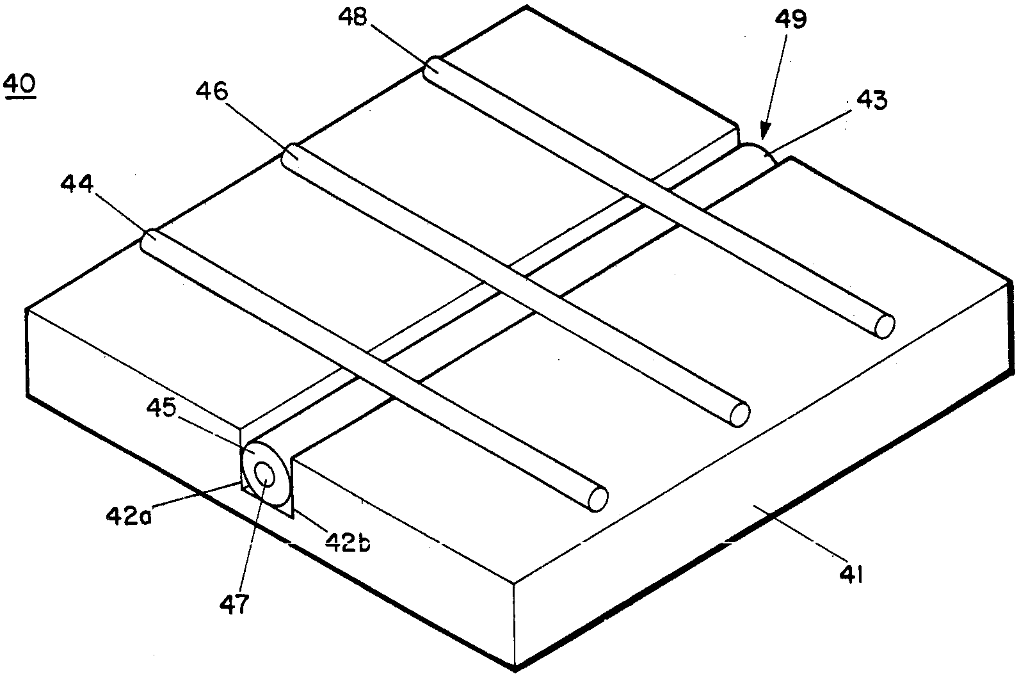
FIG. 4 is a perspective view of a modified embodiment of the imaging device of FIG. 3.

FIG. 4 is a perspective view of an ion generator 40 of the same type as that illustrated in FIG. 3, with the modification that the strip electrodes 44, 46, and 48 are replaced by an array of wires. In this embodiment wires having small diameters are most effective and best results are obtained with wires having a diameter between 1 and 4 mils.

The air breakdown in any of the above embodiments occurs in a region contiguous to the junction of the dielectric sheath and transverse conductor (see FIG. 2). It is therefore easier to extract ions from the print heads of FIGS. 3 and 4 than from that of FIG. 1, in that this region is more accessible in the former embodiments. The ion pool may extend as far as 4 mils from the area of contact, and therefore may completely surround the dielectric sheath where the latter has a low diameter.

In the preferred embodiment, the transverse conductors contact the dielectric sheath. As the separation of these members has a critical effect on ion current output, they are placed in contact in order to maintain consistent ouputs among various crossover points. This also has the benefit of minimizing driving voltage requirements. It is feasible, however to separate these structures by as much as 1–2 mil.

It is useful to characterize all of the above embodiments in terms of a "control electrode" and a "driver electrode". The electrode excited with the varying potential is termed the driver electrode, while the electrode supplied with an ion extraction potential is termed the control electrode. The energizing potential is generically described herein as "varying," referring to a time-varying potential which provides air breakdown in opposite directions, and hence ions of both polarities. This is advantageously a periodically varying potential with a frequency in the range 60 Hz.-4 MHz. In any of the illustrated, preferred embodiments, the coated conductor or wire constitutes the driver electrode, and the transverse conductor comprises the control electrode. Alternatively, the coated conductor could be employed as the control electrode.

The apparatus of the invention is characterized by the presence of a "glow discharge", a silent discharge formed in air between two conductors separated by a solid dielectric. Such discharges have the advantage of being self-quenching, whereby the charging of the solid dielectric to a threshold value will result in an electric discharge between the solid dielectric and the control electrode.

FIGS. 1, 3 and 4 illustrate various embodiments involving linear arrays of crossover points or print locations. Any of these may be extended to a multiplexible two-dimensional matrix by adding additional dielectric-coated conductors. With reference to the plan view of FIG. 5, a two-dimensional matrix print head is shown utilizing the basic structure shown in FIG. 1, with a multiplicity of dielectric-coated conductors. A matrix print head 60 is shown having a parallel array of dielectric-coated wires 61A, 61B, 61C etc. mounted above a crossing array of finger electrodes 62A, 62B, 62C, etc. A pool of ions is formed at a given crossover location $63_{x,y}$ when a varying excitation potential is applied between coated wire 61X and finger electrode 62Y. Ions are extracted from this crossover location to form an electrostatic dot image by means of an extraction potential between finger electrode 62Y and a further electrode (see FIG. 2).

This matrix print device may be used, for example, to form a latent electrostatic image on a dielectric image cylinder, as disclosed in the continuation-in-part application, filed of even date with the present application. The electrostatic image may be developed to create a visible counterpart, and transferred to plain paper or the like, using any suitable well known apparatus. In any of the two-dimensional matrix print heads, there is a danger of accidentally erasing all or part of a previously formed electrostatic dot image. This occurs in the ion generator illustrated in FIG. 5 when a crossover location 63 is placed over a previously deposited dot image, and a high voltage varying potential is supplied to the corresponding coated wire electrode 61. If in such a case no extraction voltage pulse is supplied between the corresponding finger electrode 62 and ground, the previously established dot image will be totally or partially erased. In any of the embodiments of FIGS. 1–4, this phenomenon may be avoided by the inclusion of an additional, apertured "screen" electrode, located between the control electrode and the dielectric receptor surface 100. The screen electrode acts to electrically isolate the potential on the dielectric receptor 100, and may be additionally employed to provide an electrostatic lensing action. Apparatus of a similar nature is disclosed in U.S. Pat. No. 4,160,257.

Figure 6:
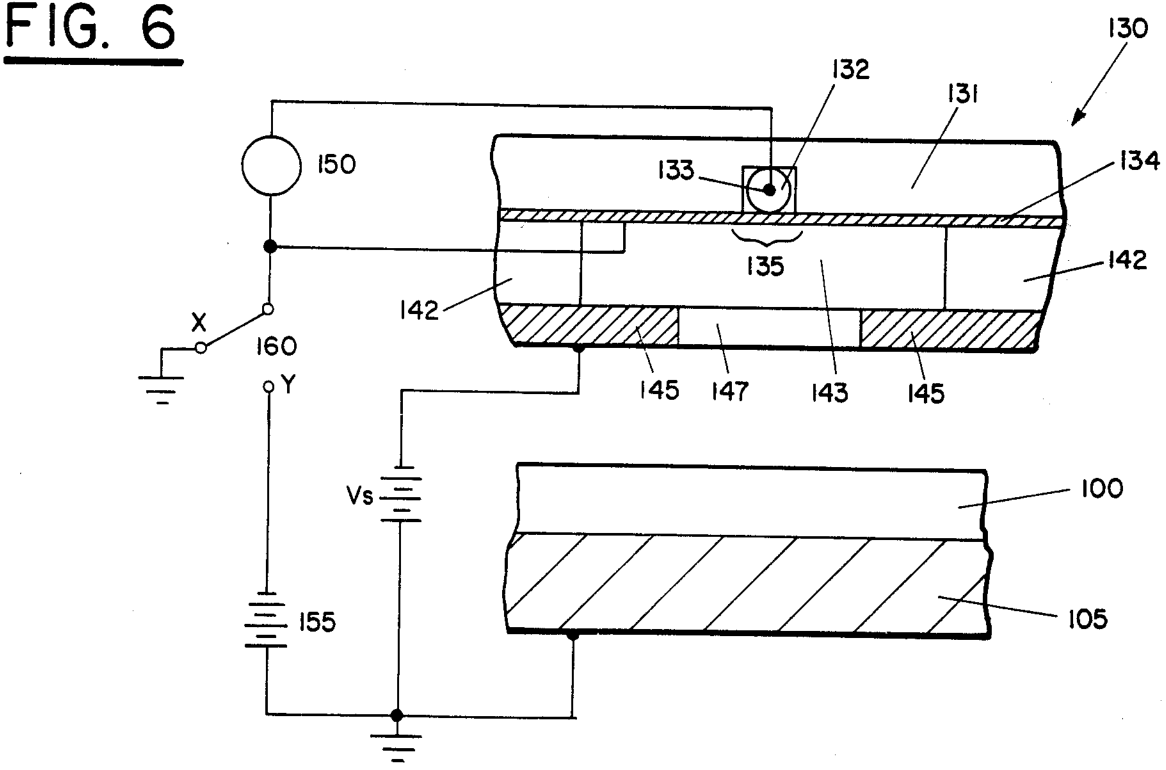
FIG. 6 is a schematic view of a three electrode version of the imaging device of FIG. 3.

FIG. 6 shows in section an ion generator 130 of the above-described type. The structure of FIG. 3 is supplemented with a screen electrode 145, which is isolated from control electrode 134 by a dielectric spacer 142. The dielectric spacer 142 defines an air space 143 which is substantially larger than the crossover region 135 of electrodes 133 and 134. This is necessary to avoid wall charging effects. The screen electrode 145 contains an aperture 147 which is at least partially positioned under the crossover region 135.

The ion generator 130 may be utilized for electrographic matrix printing onto a dielectric receptor 100, backed by a grounded auxiliary electrode 105. When switch 160 is closed at position Y, there is simultaneously an alternating potential across dielectric sheath 132, a negative potential $V_c$ on control electrode 134, and a negative potential $V_s$ on screen electrode 145. Negative ions at crossover region 135 are subjected to an accelerating field which causes them to form an electrostatic latent image on dielectric surface 100. The presence of negative potential $V_s$ on screen electrode 145, which is chosen so that $V_s$ is smaller than $V_c$ in absolute value, does not prevent the formation of the image, which will have a negative potential $V_i$ (smaller than $V_c$ in absolute value). When switch 160 is at X, and a previously created electrostatic image of negative potential $V_i$ partially under aperture 147, a partial erasure of the image would occur in the absence of screen electrode 145. Screen potential $V_s$, however, is chosen so that $V_s$ is greater than $V_i$ in absolute value, and the presence of electrode 145 therefore prevents the passage of positive ions from aperture 147 to dielectric surface 100.

Screen electrode 145 provides unexpected control over image size, by varying the size of screen apertures 147. Using a configuration such as that shown in FIG. 6, a larger screen potential has been found to produce a smaller dot diameter. This technique may be used for the formation of fine or bold images. It has also been found that proper choices of $V_s$ and $V_c$ will allow an increase in the distance between ion generator 130 and dielectric surface 100 while retaining a constant dot image diameter. This is done by increasing the absolute value of $V_s$ while keeping the potential difference between $V_s$ and $V_c$ constant.

Image shape may be controlled by using a given screen electrode overlay. Screen apertures 147 may, for example, assume the shape of fully formed characters which are no larger than the corresponding crossover regions 135. This technique would advantageously utilize larger crossover regions 135. The lensing action provided by the apertured screen electrode generally results in improved imaging definition, at the cost of decreased ion current output.

Figure 7:
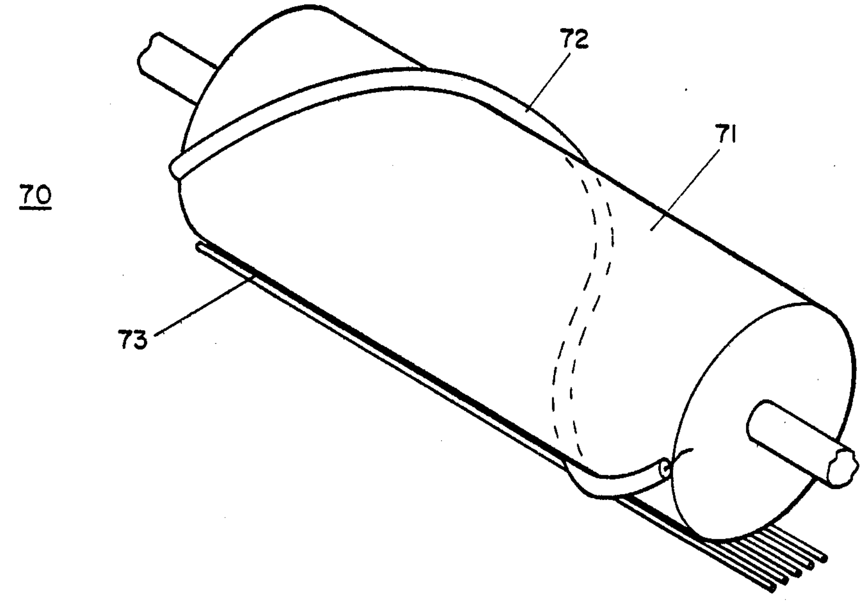
FIG.7 is a perspective view of an imaging device in accordance with a further alternative embodiment of the invention.

FIG. 7 illustrates yet another electrostatic imaging device 70 for use in a high speed serial printer. An insulating drum 7 is caused to rotate at a high rate of speed, illustratively around 1200 rpm. To this drum is bonded a dielectric-coated conductor 72 in the form of a helix. The drum is disposed over an array of parallel control wires 73 which are held rigid under spring tension. The dielectric-coated wire is maintained in gentle contact with or closely spaced from the control wire array. By rotating the drum, the helical wire provides a serial scanning mechanism. As the helix scans across the wire with a high frequency high voltage excitation applied to dielectric-coated wire 72, printing is effected by applying an extraction voltage pulse to one of the control electrode wires 73.

Figure 5:
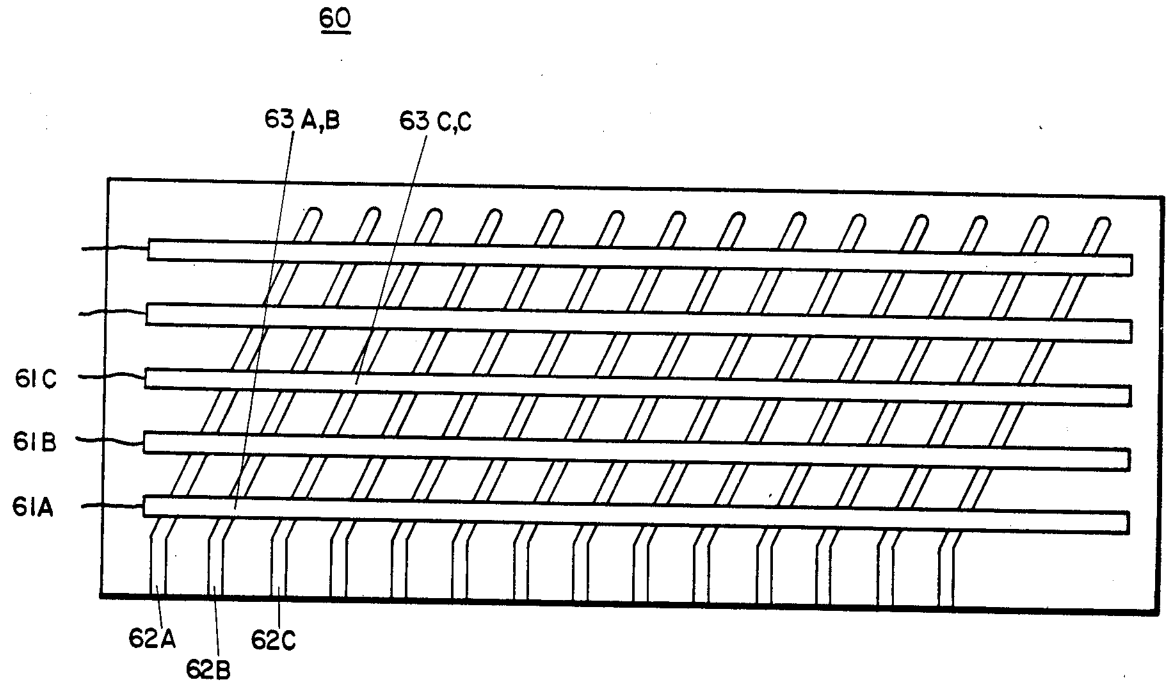
FIG. 5 is a plan view of a two-dimensional matrix version of the imaging device of FIG. 1.
Figure 8:
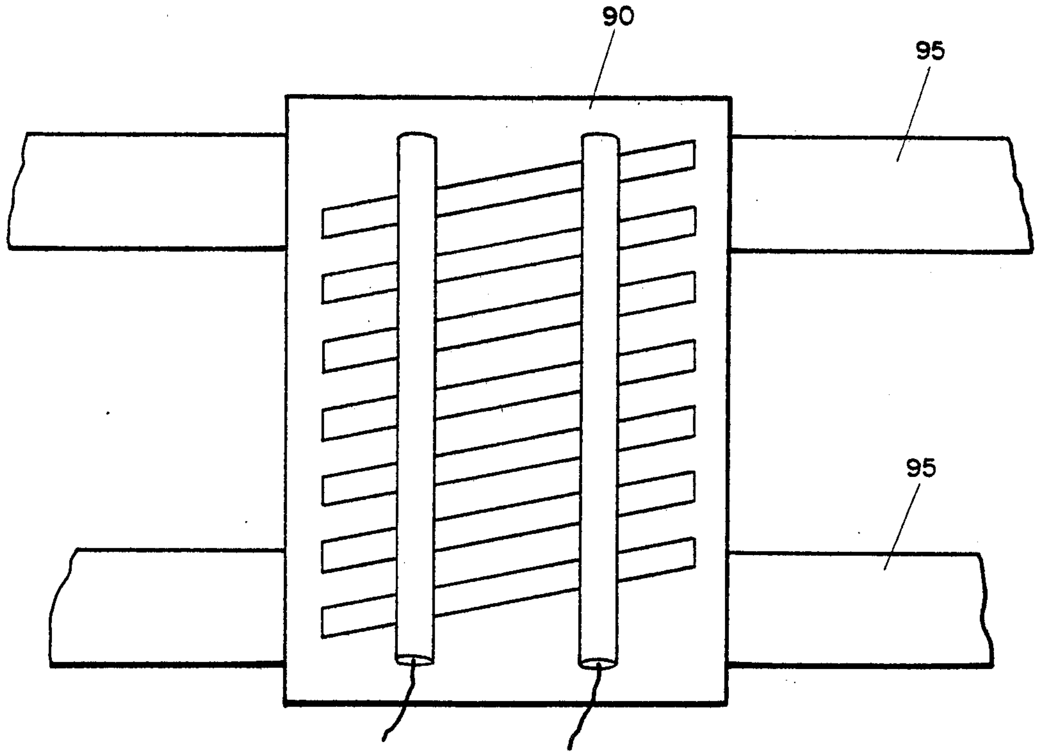
FIG. 8 is a plan view of a serial printer incorporating the imaging device of FIG. 5.

FIG. 8 illustrates an alternative scheme for providing a relative motion between the print device of the invention and a dielectric receptor surface. A charging head 90 in accordance with FIG. 5 is slidably mounted on guide bars 95. Any suitable means may be provided for reciprocating print head 90, such as a cable drive actuated by a stepping motor. This system may be employed to form an electrostatic image on dielectric paper, a dielectric transfer member, etc.

The electrostatic printing device of the invention is further illustrated with reference to the following specific embodiments.

EXAMPLE 1

An imaging device of the type illustrated in FIG. 1 was fabricated as follows. The insulating support 11 comprised a G-10 epoxy fiberglass circuit board. Control electrodes 14, 16, 18 etc. were formed by photoetching a 1 mil stainless steel foil which had been laminated to insulating substrate 11, providing a parallel array of 4 mil wide strips at a separation of 10 mils. The driver electrode 23 consisted of a 5 mil tungsten wire coated with a 1.5 mil layer of fused glass to form a structure having a total diameter of 8 mils.

AC excitation 62 was provided by a gated Hartley oscillator operating at a resonant frequency of 1 MHz. The applied voltage was in the range of 2000 volts peak-to-peak with a pulse width of 3 microseconds, and a repetition period of 500 microseconds. A 200 volts DC extraction potential 68 was applied between selected control electrodes and an electrode supporting a dielectric charge receptor sheet. The ion generating array was positioned 0.01 inches from the dielectric-coated sheet.

This apparatus was employed to form dot matrix characters in latent electrostatic form on dielectric sheet 100. After conventional electrostatic toning and fusing, a permanent high quality image was obtained.

EXAMPLE 2

An ion projection print device of the type illustrated in FIG. 3 was fabricated as follows. A channel 39 of 5 mils depth and 10 mils width was milled in 0.125 inch thick G-10 epoxy fiberglass circuit board. A driver electrode 33 identical to that of Example 1 was laid in the channel. Photoetched stainless steel foil electrodes 34, 36, 38, etc. were laminated to circuit board 51, contacting dielectric 35.

The device exhibited equivalent performance to the imaging device of Example 1 when excited at the same potential.

EXAMPLE 3

The electrostatic print device of Example 2 was modified to provide imaging apparatus of the type shown in FIG. 4. The control electrodes comprised a series of 3 mil diameter tungsten wires cemented to support 41.

This device achieved approximately double the ion current output as compared with the devices of Examples 1 and 2.

In all three examples, the glass coated wire was not firmly bonded in place, but was allowed to move freely along its axis. This provided a freedom of motion to allow for thermal expansion when operating at high driving potentials.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims.

I claim:

1. Electrostatic imaging apparatus, comprising:
an elongate conductor;
a dielectric sheath for said elongate conductor;
a conductive member transversely oriented with respect to said elongate conductor and contacting or closely spaced from said dielectric sheath;
a varying potential applied between said elongate conductor and said conductive member in order to generate ions in an air region adjacent the dielectric sheath and conductive member; and
means for extracting ions from said air region to create an electrostatic image on a further member.

2. Apparatus as defined in claim 1, further comprising an insulating substrate to support the elongate conductor, dielectric sheath, and conductive member.

3. Apparatus as defined in claim 2 wherein said insulating substrate includes a slot, said elongate conductor and dielectric sheath are embedded in the slot, and said conductive member is transversely mounted on said insulating substrate.

4. Apparatus as defined in claim 3 wherein the conductive member comprises a strip.

5. Apparatus as defined in claim 3 wherein the conductive member comprises a wire.

6. Apparatus as defined in claim 2 wherein the conductive member comprises a conductive strip mounted on said insulating substrate, and said elongate conductor and dielectric sheath are transversely mounted over said conductive strip.

7. Apparatus as defined in claim 1 wherein said elongate conductor and dielectric sheath comprise a wire coated with a thick dielectric.

8. Apparatus as defined in claim 1 wherein the dielectric comprises an inorganic dielectric material.

9. Apparatus as defined in claim 1 wherein a multiplicity of elongate conductors with dielectric sheaths form crosspoints in a matrix array with a multiplicity of conductive members.

10. Apparatus as defined in claim 1 wherein the extraction means comprises an extraction potential between the conductive member and a further conductor.

11. Apparatus as defined in claim 10, further comprising:
an apertured screen electrode;
a solid dielectric layer separating said screen electrode from the conductive member; and
a screen voltage between said screen electrode and said further member.

12. Apparatus as defined in claim 1 wherein said varying potential comprises an alternating potential with a frequency between 60 Hertz and 4 Megahertz.

13. Apparatus as defined in claim 1 further comprising:
a rotatable drum, on which the elongate conductor and dielectric sheath are mounted in a helical pattern;
wherein a plurality of conductive members are disposed along an edge line of said rotatable drum.

14. Electrostatic imaging apparatus, comprising:
an elongate conductor;
a dielectric sheath for said elongate conductor;
a conductive member transversely oriented with respect to said elongate conductor and contacting or closely spaced from said dielectric sheath;
a varying potential applied between said elongate conductor and said conductive member in order to generate ions in an air region ajacent the dielectric sheath and conductive member;
an extraction potential between the conductive member and a further conductor;
an apertured screen electrode;
a dielectric layer separating the screen electrode from the conductive member; and
a screen voltage between the screen electrode and the further conductor.

15. Apparatus as defined in claim 14 wherein the screen voltage is smaller than the extraction potential in absolute value, whereby said screen voltage does not prevent the extraction of ions.

16. Apparatus as defined in claim 14, further comprising means for providing a relative motion between said electrostatic imaging apparatus and said further member, and
means for modulating said extraction potential in order to selectively form an electrostatic pattern on said further member of voltage $V_I$ with respect to said further conductor,
wherein the screen voltage is larger in magnitude than the image potential $V_I$ in order to prevent undesired image erasure.

17. Apparatus as defined in claim 14 wherein said screen electrode comprises a mask electrode having an aperture configured as a character or symbol.

18. Apparatus as defined in claim 1 wherein the electrostatic imaging apparatus is separated from said further member by a distance of between 5 and 20 mils.

19. An electrostatic imaging method comprising the steps of
applying a varying potential between an elongate conductor having a dielectric sheath and a conductive member transversely oriented with respect to said elongate conductor and contacting or closely spaced from said dielectric sheath, in order to generate ions in an air region adjacent the dielectric sheath and conductive member,
extracting ions from said air region, and
applying the extracted ions to a further member to form an electrostatic image.

20. The method of claim 19 wherein a multiplicity of elongate conductors with dielectric sheaths form crosspoints in a matrix array with a multiplicity of conductive members.

21. The method of claim 20 wherein ions are extracted from said matrix crossover points by simultaneously providing both a glow discharge at said crossover point and an external ion extraction field.

22. The method of claim 19 wherein the extracting step comprises applying an extraction potential between said conductive member and a further conductor.

23. The method of claim 22 wherein said further conductor has a dielectric surface, and the applying step comprises applying the extracted ions to said dielectric surface.

24. The method of claim 19 further comprising the step of toning said electrostatic image.

25. The method of claim 24 wherein the electrostatic image is formed on a dielectric layer, further comprising the step of transferring the toned electrostatic image to plain paper.

26. The method of claim 22, further comprising the step of:

providing an apertured "screen" electrode which is separated from the conductive member by a dielectric layer and which lies between the conductive member and the further member; and applying a screen voltage between the screen electrode and a further electrode.

27. The method of claim 26 wherein the screen electrode has the same polarity as the extraction potential.

28. The method of claim 26 further comprising the step of controlling the size of the electrostatic image by providing an aperture of appropriate size in said screen electrode.

29. The method of claim 26 further comprising the step of controlling the size of the electrostatic image by providing a screen voltage of appropriate magnitude and polarity.

30. The method of claim 26 further comprising the step of controlling the size of the electrostatic image by providing an appropriate distance between the screen electrode and said further member.

31. The method of claim 26 further comprising the step of controlling the shape of the electrostatic image by providing apertures of appropriate shape in the screen electrode.

32. Electrostatic imaging apparatus, comprising:

an insulating substrate including at least one slot;

an elongate conductor;

a dielectric sheath for said elongate conductor, wherein said elongate conductor and dielectric sheath are embedded in the slot in said insulating substrate;

a conductive member mounted on said insulating substrate transversely to and contacting or closely spaced from said dielectric sheath;

a varying potential applied between the elongate conductor and conductive member to generate a glow discharge adjacent the dielectric sheath; and means for extracting ions from said glow discharge to create an electrostatic image on a further member.

33. Apparatus as defined in claim 32 wherein the conductive member comprises a strip.

34. Apparatus as defined in claim 32 wherein the conductive member comprises a wire.

35. Electrostatic imaging apparatus, comprising:

a rotatable drum;

an elongate conductor;

a dielectric sheath for said elongate conductor, said elongate conductor and dielectric sheath being circumferentially mounted on said rotatable drum in a helical pattern;

a plurality of conductive members disposed along an edge line of said rotatable drum, contacting or closely spaced from said dielectric sheath;

a time varying potential applied between at least one of said conductive members and the elongate conductor to generate a glow discharge adjacent the dielectric sheath; and means for extracting ions from said glow discharge to create an electrostatic image on a further member.

* * * * *